C. D. GERVIN.

ARGAND GAS-BURNER.

No. 6,769. Reissued Nov. 30, 1875.

WITNESSES.

John. Cook

Aaron Lloyd

Charles D. Gervin by Sidney Brown Atty

INVENTOR.

N. PETERS, PHOTO-LITHOGRAPHER, WASHINGTON, D. C.

UNITED STATES PATENT OFFICE.

CHARLES D. GERVIN, OF WILLIAMSBURG, NEW YORK.

IMPROVEMENT IN ARGAND GAS-BURNERS.

Specification forming part of Letters Patent No. 157,388, dated December 1, 1874; reissue No. 6,769, dated November 30, 1875; application filed November 9, 1875.

*To all whom it may concern:*

Be it known that I, CHARLES D. GERVIN, of Williamsburg, Kings county, New York, have invented, made, and applied to use certain Improvements in Argand Gas-Burners, of which the following is a specification, reference being had to the accompanying drawings, making a part of this specification, and to the letters of reference marked thereon, in which—

Figure 1:
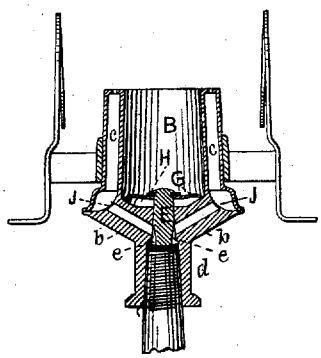
Figure 2:
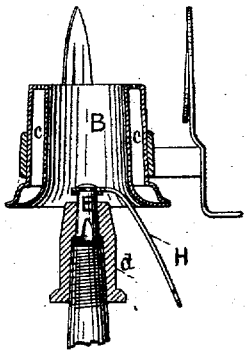
Figure 3:
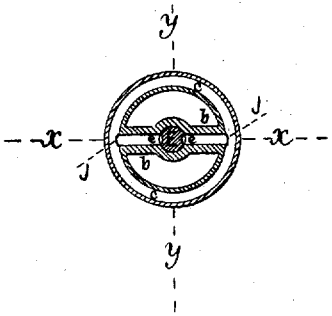
Figure 4:
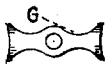

Figure 1 is a central vertical section of a burner made in accordance with my invention, taken in the lines *x x* of Fig. 3. Fig. 2 is also a central vertical section taken in the lines of *y y*, Fig. 3. Fig. 3 is a transverse horizontal section of my invention. Fig. 4 is a detail view of the elastic bar G.

In the drawings, like parts of the invention are indicated by the same letters of reference.

The nature of the present invention relates to certain improvements, as more fully hereinafter set forth, in the construction of Argand gas-burners; and consists in the use or employment of a two-way cock, in combination with an Argand gas-burner, whereby the communication from the supply-pipe to the burner may be cut off by turning the cock, as desired.

To enable those skilled in the arts to make and use my invention, I will describe the construction and operation of the same.

B shows a burner provided with the arms *b b* and the annular chamber *c;* the arms *b b* extending radially from the neck *d*, in the center of which is inserted a plug or two-way cock, E, which may be either cylindrical or tapering, and which may be ground to its seat in the neck or nipple without the necessity for a seat made of a separate piece, as is customary. This plug E is formed with one or more recesses, *e*, and if two are used diametrically opposite each other, so that when in the position shown in Figs. 1 and 3, the communication is open between the neck *d* and the arms *b* and the annular chamber *c*. The plug is formed with a rim or flange on its lower end, and is inserted in the neck from below, the flange fitting or bearing against the interior of the neck, so that the plug is secured in position within the neck, and thus the elastic bar G is prevented from drawing the plug up so tightly that it cannot be easily turned when in use. Over the upper end of the plug is placed a perforated bar, G, and a lever, H, is upset or riveted down thereon. The bar G is made of elastic metal, and has its ends formed to rest upon the arms *b b*, near their junction with the circular portion of the burner B. By this arrangement the plug is attached and secured in its place, and the elasticity of the bar G keeps it in place in its seat. The lever H is attached to the plug E at one end, and the other end is turned down and extends below the burner to serve as a handle for operating the plug. At the ends of the arms, where they communicate with the annular chamber *c*, are wire-gauze diaphragms J, which serve to break the current of gas, and prevent whistling when the gas is burning.

Having now set forth my invention, what I claim as my invention is—

1. The combination of a burner, B, and a plug, E, having a shouldered lower end to fit beneath a shoulder in the neck *d*, and formed with one or more recesses, *e*, substantially as and for the purpose set forth.

2. The combination of a burner, B, a plug, E, and an elastic bar, G, constructed and operating substantially as and for the purposes described.

3. The combination of a burner, B, plug, E, and lever H, constructed and operating substantially as described, and for the purposes indicated.

CHARLES D. GERVIN.

In presence of—
A. SIDNEY DOANE,
E. P. GLEASON.